(12) United States Patent
Wölk

(10) Patent No.: US 8,361,619 B2
(45) Date of Patent: Jan. 29, 2013

(54) PROCESS FOR PREPARING NANOCRYSTALLINE MIXED METAL OXIDES

(75) Inventor: Hans-Jörg Wölk, Rosenheim (DE)

(73) Assignee: Sud-Chemie AG, Munich (DE)

( * ) Notice: Subject to any disclaimer, the term of this patent is extended or adjusted under 35 U.S.C. 154(b) by 768 days.

(21) Appl. No.: 12/440,303

(22) PCT Filed: Sep. 7, 2007

(86) PCT No.: PCT/EP2007/007841
§ 371 (c)(1),
(2), (4) Date: Aug. 28, 2009

(87) PCT Pub. No.: WO2008/028681
PCT Pub. Date: Mar. 13, 2008

(65) Prior Publication Data
US 2010/0015446 A1      Jan. 21, 2010

(30) Foreign Application Priority Data
Sep. 7, 2006   (DE) .......................... 10 2006 042 013

(51) Int. Cl.
*B32B 5/16* (2006.01)
(52) U.S. Cl. ......... 428/402; 428/403; 427/212; 977/811
(58) Field of Classification Search .................. 428/402, 428/403; 427/212; 977/811
See application file for complete search history.

(56) References Cited

U.S. PATENT DOCUMENTS

| 2005/0152832 A1* | 7/2005 | Ying et al. ................... 423/600 |
| 2006/0166057 A1 | 7/2006 | Kodas et al. | |

FOREIGN PATENT DOCUMENTS

| EP | 1 227 139 A1 | 7/2002 |
| JP | 2005-320189 | 11/2005 |
| WO | WO 02/072471 A2 | 9/2002 |
| WO | WO2004/005184 | * 1/2004 |
| WO | WO 2004/005184 A1 | 1/2004 |
| WO | WO 2005/070819 A1 | 8/2005 |
| WO | WO 2005/087660 A1 | 9/2005 |
| WO | WO 2006/027270 A2 | 3/2006 |

OTHER PUBLICATIONS

International Search Report, dated Feb. 21, 2008.
Office Action in U.S. Appl. No. 12/373,440 dated Aug. 14, 2012.

* cited by examiner

*Primary Examiner* — Leszek Kiliman
(74) *Attorney, Agent, or Firm* — RatnerPrestia

(57) ABSTRACT

The present invention relates to a process for the preparation of nanocrystalline mixed metal oxide particles from at least two different starting compounds, comprising the steps of a) introducing a stoichiometric mixture of the starting compounds into a reaction chamber by means of a carrier fluid, b) subjecting the starting compound to a pulsating thermal treatment in a treatment zone under a pulse in the reaction chamber, c) formation of nanocrystalline mixed metal oxide particles, d) the removal from the reactor of the nanocrystalline mixed metal oxide particles obtained in steps b) and c), wherein the stoichiometric mixture of the starting compounds takes place at a temperature of >50° C. Further, the present invention relates to a nanocrystalline mixed metal oxide, in particular for use as a catalyst, obtainable by the process according to the invention.

15 Claims, 2 Drawing Sheets ns application of application number PCT/EP2007/007841, filed Sep. 7, 2007 (which is incorporated herein by reference in its entirety), which claims priority benefit of DE 10 2006 042 013.6 filed Sep. 7, 2006.

PROCESS FOR PREPARING NANOCRYSTALLINE MIXED METAL OXIDES

This is a U.S. National Phase application of application number PCT/EP2007/007841, filed Sep. 7, 2007 (which is incorporated herein by reference in its entirety), which claims priority benefit of DE 10 2006 042 013.6 filed Sep. 7, 2006.

FIELD OF INVENTION

The present invention relates to a process for the preparation of nanocrystalline mixed metal oxides, nanocrystalline mixed metal oxides prepared according to the process according to the invention and their use as catalysts, in particular during the preparation of methanol from carbon monoxide and hydrogen and the oxidation of carbon monoxide.

BACKGROUND OF INVENTION

Metal oxides, in particular mixed metal oxides, have an ever greater field of use, in particular in ceramics, polymer additives, fillers, pigments, reactive surfaces and catalysts etc.

Additionally, for example copper oxides with a perovskite structure display phase transitions to superconductors at surprisingly high temperatures and are therefore the subject of numerous investigations. This applies in particular to the classes of the lanthanum-strontium cuprates, for example $La_{2-x}Sr_xCuO_4$ or to yttrium-barium cuprates, such as for example $YBa_2Cu_3O_{7-\Delta}$.

Typical representatives of these classes of compounds are for example the so-called titanates, zirconates and hafniates, which are divided in particular into the classes of orthotitanates $M_2^{II}TiO_4$ and metatitanates $M^{II}TiO_3$.

However, these compounds almost never contain the discrete ions $[TiO4]^{4-}$ and $[TiO3]^{2-}$, analogously to the phosphates or sulphites. The structures of these mixed metal oxides consist of three-dimensional ion arrangements which are particularly interesting.

If $M^{II}$ is of a comparable size to $Ti^{IV}$, for example in the case of M=Mg, Mn, Fe, Co, Ni, then that structure of the ilmenite, $FeTiO_3$, is present which is constructed from hexagonally very tightly packed oxygen atoms, wherein one third of the octahedral holes is occupied by $M^{II}$ and a further third by $Ti^{IV}$. This corresponds essentially to the so-called basic structure of $Al_2O_3$, with the difference that in the latter cases there is only a type of cations which contain two-thirds of the octahedral spaces.

If, on the other hand, $M^{II}$, is substantially larger than $Ti^{IV}$ (for example M=Ca, Sr, Ba), then the structure of the perovskite, $CaTiO_3$, is preferred.

Perovskites can be thought of as being constructed from a cubically very tight packing of spheres of calcium and oxygen atoms, in which the former are arranged regularly and the titanium atoms exclusively occupy the octahedral holes formed by the oxygen atoms, with the result that they can be kept as far away as possible from the calcium atoms. The perovskite lattice is widened by the size of the $Ba^{II}$ ions such that the titanium atom is too small to fill all of the octahedral hole. Ferro- and piezoelectric properties are brought about by this. Barium titanate is used for example during the preparation of compact capacitors because of its high dielectric constant, as well as in ceramic transducers in the case of microphones and pick-ups.

The compounds $M_2^{II}TiO_4$ (m=Ng, Zn, Mn, Fe, Co) adopt the so-called spinel structure of $MgAl_2O_4$. This is the third important structural type which is preferred by several mixed metal oxides. Here, the cations possess both octahedral and tetrahedral holes in a cubically very tight packing of spheres arrangement of the oxide ions.

Such mixed metal oxides, in particular for example perovskites, are also used as catalysts, for example in the field of catalytic converters in cars, during the preparation of photocatalysts and for the preparation of oxidic catalysts, in particular for the preparation of methanol and the oxidation of carbon monoxide. Here the process of calcining the starting materials during the preparation process greatly influences the quality of the end catalysts and thus also their possible uses in catalysis. (see Zuhlke, Dissertation, TH Karlsruhe 1999)

The targeted control of the crystallization process can be influenced by the composition of the educt(s). An important factor here, in particular when used in catalysis, is the crystallite size (R. Schlögel et al, Angewandte Chemie 116, 1628-1637, 2004).

Nanocrystalline "powders" are also increasingly coming into consideration, despite the fact that preparation problems have for the most part remained unsolved.

Such nanocrystalline mixed oxide powders have thus far usually been prepared either by (wet-)chemical synthesis, by mechanical processes or by so-called thermophysical processes.

In the case of perovskites, BET surface areas of approx. 2 to 10 m²/g are achieved with the conventional processes known thus far.

Typically, during the chemical synthesis of nanocrystalline powders, starting from so-called precursor compounds, a powder is synthesized by chemical reactions for example by means of hydroxide precipitation, synthesis by hydrolysis of organometallic compounds and hydrothermal processes. The definitive structure of nanocrystallites typically establishes itself, as already mentioned, only after or during calcining.

Mechanical preparation processes are characterized by intensive grinding of inhomogeneous particles into homogeneous particles, which often also leads to undesired phase transformations to the point where particles become amorphous due to the pressure exerted on the particles.

Typically, the particles formed in the process are not present in a uniformly homogeneous size distribution. Moreover, there is the risk of abrasion by the grinding tools, and thus of a contamination of the products, which is disadvantageous in particular when using the thus-obtained nanocrystalline mixed oxides in the field of catalysis.

Thermophysical methods are for example described in WO 2004/005184. These are based on the introduction of thermal energy into solid, liquid or gaseous starting compounds. The above-mentioned international patent application relates in particular to the so-called plasma-pyrolytic spray process (PSP), in which the starting materials are atomized in an oxyhydrogen flame and decomposed in the process. A preferred technical application of this technology is in the preparation of fine crystalline silicon dioxide in which readily volatile organosilicon compounds are atomized in an oxyhydrogen flame.

Moreover, during the synthesis of nanocrystalline particles the so-called plasma synthesis process has been used in which the starting materials are evaporated in a 6000K-hot plasma. Further customary processes of the state of the art are for example CVD processes in which gaseous educts are reacted, wherein non-oxidic powders or mixed oxide compounds with different phase structures also often form.

The above-named processes of the state of the art have disadvantages in particular in relation to the presence of a very broad particle-size distribution of the nanocrystallites, undesired agglomerations of the nanocrystalline particles among one another and also incomplete phase transitions, i.e. often, only 40 to 70% of the desired end-product is obtained in the end-product, which necessitates further purification steps or recrystallization.

SUMMARY OF THE INVENTION

The object of the present invention was therefore to provide a further process for the preparation of nanocrystalline mixed oxide powder distributed as monomodally as possible which avoids the above-named disadvantages of the state of the art, in particular the occurrence of phase transitions and mixed phases or incomplete reactions of the starting products and achieves an adjustable nanocrystalline particle size and furthermore provides particles with an inner surface of a specific size and with defined crystal structure.

This object is achieved according to the invention by a process for the preparation of nanocrystalline mixed metal oxides of at least two different starting compounds, comprising the steps of
a) introducing a stoichiometric mixture of the starting compounds into a reaction chamber by means of a carrier fluid,
b) subjecting the starting compound to a pulsating thermal treatment in a treatment zone under a pulse in the reaction chamber,
c) formation of nanocrystalline mixed metal oxide particles,
d) the removal from the reactor of the nanocrystalline mixed metal oxide particles obtained in steps b) and c),
wherein the preparation of the mixture of the stoichiometric mixture of the starting compounds takes place at a temperature of >50° C.

DETAILED DESCRIPTION OF INVENTION

It was surprisingly found that particularly small crystallites with particle sizes <30 µm, particularly preferably <20 µm, quite particularly preferably <10 µm and most preferably <5 µm, can be obtained by a heat treatment during the mixing of the stoichiometric starting compound. Perovskites, ilmenites and spinels are often present in a so-called domain structure which can be selectively influenced in targeted manner by a corresponding heat treatment, with the result that perovskites, ilmenites or spinels with a particularly good domain structure can be obtained in the pure phase with small crystallite sizes.

It was found that, without the application of heat treatment in the process according to the invention, the domain structure with the obtained mixed oxides generally does not have domain borders and impure structures or mixed phases within the obtained products result.

Thus, through the process according to the invention, the crystallization process can be controlled in targeted manner, here in particular through the further steps also the size of the crystallites and the pore-size distribution of the corresponding mixed metal oxides. This can for example also be further advantageously influenced by the residence time of the starting mixture of the starting compound in the flame or by the reactor temperature. Through the pulsating thermal treatment, the nanocrystalline particles that form are prevented from agglomerating. Typically, the nanocrystalline particles are immediately conveyed by the stream of hot gas into a colder zone of the reaction chamber or of the reactor where nanocrystallites can be obtained, some with diameters of less than 20 nanometers. In the case of the mixed oxide nanocrystallites obtained according to the invention, this leads to clearly increased BET surface areas.

By way of example it was found in the case of the structural group of the perovskite that, with the synthesis processes known thus far for perovskite, a BET surface area of approx. 2 to 10 $m^2/g$ is obtained, whereas, with the process according to the invention, perovskite nanocrystallites with a BET surface area of 100 to 200 $m^2/g$, preferably 150-200 $m^2/g$, are obtained. Values in this range are also obtained for ilmenites and spinels which have been prepared by means of the process according to the invention.

In a preferred embodiment of the process according to the invention, citric acid or a citric acid salt is additionally introduced into the mixture of the starting compounds. As an alternative to citric acid or its derivatives, maleic acid or its derivatives can for example also be used, as both with citric acid and maleic acid and also respectively their derivatives a particularly good precipitation of the metal complex is achieved through the chelation between metal and acid. Moreover, in particular when using citric acid and its derivatives, a very fine distribution of the resulting metal complexes/crystallites is achieved, thus enabling during calcining a conversion to the complex perovskite structures with very pure phases.

Further advantages of the process according to the invention are that, for example, suspensions can usually be calcined within a very short period, typically within a few milliseconds, at comparatively low temperatures of 300 to 700° C., without additional filtration and/or drying steps or without the addition of additional solvents. The milder calcining, compared with customary processes which are typically carried out at temperatures of more than 900° C., also makes it possible for the phase structure of the obtained products to be so pure that for example yttrium-barium cuprates which are obtained with the process according to the invention can also be used as substances of optical waveguides within the framework of optical analysis methods. This has until now been a worthwhile aim of yttrium-barium cuprates known thus far, but has hitherto been achieved only inadequately (J. Kircher, Dissertation TH Karlsruhe 1992, Ellipsometrische Untersuchungen zum elektronischen Normalzustand der Yttriumbariumcuprate).

The nanocrystalline mixed oxide compounds obtained by means of the process according to the invention have significantly increased BET surface areas, which when using such mixed oxides as active materials leads to catalysts with increased reactivity, improved conversion and selectivity. Because the residence time of every particle is virtually the same, the homogeneous temperature field produced by the process results in an extremely homogeneous end-product with a narrow monomodal particle distribution of the resultant mixed oxide nanocrystallites.

The nanocrystallites obtained according to the invention can also serve as supports for other catalyst systems, such as e.g. Ni, Pd/Pt etc, for example magnesium aluminate prepared by means of the process according to the invention.

A device for carrying out the process according to the invention during the preparation of such a monomodal nanocrystalline mixed metal oxide powder is for example basically described in DE 101 09 82 A1. Unlike the device described there and the process disclosed there, the present process does not, however, require a preliminary evaporation step in which volatile starting materials are heated to an evaporation temperature. Therefore in DE 101 09 82 A1 the necessary front-end evaporation step or the corresponding module of the device for the evaporation of the starting materials is also dispensed with. The stoichiometric mixture of the starting compounds is introduced into the reaction chamber in the form of a solution, slurry, suspension or solid.

Typically, the mixture from which the mixed metal oxide powders according to the invention are prepared is introduced into the so-called reaction chamber, more precisely into the combustion chamber, preferably in atomized form, directly via a carrier fluid, in particular a carrier gas, preferably an inert carrier gas, such as for example nitrogen, etc.

The possibility of already very precisely determining the stoichiometry when choosing the starting materials is a further advantage of the process according to the invention which can be achieved only inadequately with other processes.

Attached exhaust side to the reaction chamber is a resonance space with a flow cross-section which is clearly reduced compared with the reaction chamber. The floor of the combustion chamber is equipped with several valves for the entry of the combustion air into the combustion chamber. The aerodynamic valves are fluidically and acoustically matched to the combustion chamber and the resonance-tube geometry such that the pressure waves, created in the combustion chamber, of the homogeneous flameless temperature field spread pulsating predominantly in the resonance tube. Thus a so-called Helmholz resonator with pulsating flow forms. Pulsation can be regular or irregular.

Material is typically fed into the reaction chamber either with an injector or with a suitable two-component nozzle and a Schenk dispenser. The reactors used according to the invention typically have a rated power of 50-250 Kw. For example, natural gas, propane, hydrogen or the like are used as fuel to produce the pulsating thermal field. The temperature can for example even be lowered to 250° C. in order to obtain the mixed oxide nanocrystalline powders according to the invention.

Typical quantities when feeding through material of the process according to the invention lie in the range up to 150 kg/hour of a solid or suspension of the stoichiometric mixture of the starting compounds.

The typical residence time in the thermal treatment step is 200 ms to approx. 2 s and the obtained crystallite size approx. 5 nm to 100 μm, preferably 5 nm to 30 μm, quite particularly preferably 10 nm to 20 μm.

The process according to the invention thereby further makes possible the preparation of monomodal nanocrystalline mixed oxide powders by direct introduction of a stoichiometric mixture of the corresponding starting compounds into the reactor. Surprisingly, for example dry mixed oxide powders of oxidic starting compounds can also be introduced directly into the combustion chamber as a stoichiometric mixture in the solid state without the crystalline materials that form needing to be filtered. Furthermore the process according to the invention makes possible a lower temperature during the preparation of the mixed-metal oxides according to the invention than the customary processes known thus far.

In addition, for example in the preferred case using solutions, in particular aqueous solutions of the starting products, a further precipitation step such as is usually necessary in the hydroxide method can be avoided, with the result that the solution can be thermally treated, i.e. calcined, directly in the reactor.

The carrier fluid is preferably a carrier gas, such as for example air, nitrogen or air/nitrogen mixtures. A liquid can naturally also be alternatively used as fluid or even the starting materials present already in solution as a solution itself. The nature of the carrier fluid has an influence in particular on the residence time in the treatment zone. Thus for example direct suspensions and slurries of poorly soluble starting compounds such as sulphates, oxides, nitrides, etc., can also be used directly according to the invention.

Preferably, the starting compound is introduced into the reaction chamber in atomized form, with the result that a fine distribution in the region of the treatment zone is guaranteed.

The crystallite size and porosity can also be decisively determined by controlling the pulsation (regular or irregular or over the period and the amplitudes of the pulsating thermal treatments) and the residence time of the starting compounds in the treatment zone (typically in a period of 200 ms to 2 s).

After the thermal treatment, the nanocrystalline mixed-metal oxides that form are, if possible, immediately transferred into a colder zone of the reaction chamber by means of the carrier fluid, with the result that they are deposited there in the colder zone and can be removed. Calculated on the stoichiometric mixture of the starting substances, the yield of the process according to the invention is almost 1%, as nearly all of the product that forms can be removed from the reactor as a solid.

As already stated above, it was also surprisingly found that oxides already present in solid form can also be used as starting substances. According to the invention these are immediately converted by the subsequent pulsating temperature treatment into nanocrystalline mixed oxide particles. In particularly advantageous developments of the process according to the invention, this opens up a particularly broad field of application as it is not necessary to select specific starting compounds, for example in respect of their solubility, volatility, etc., in order to determine whether they can be used at all within the framework of a process.

It is equally possible that soluble metal compounds are used as a mixture of the starting compounds in further preferred developments of the process according to the invention. In particular, readily available starting compounds of the metal nitrates, chlorides, acetates, etc. of metals or transition metals can be used.

Surprisingly, it was found that the thermal treatment can be carried out at low temperatures of 200° C. to 700° C., preferably below 700° C., for example 350° C. to 650° C., which is advantageous in comparison to the previously known thermal decomposition processes which are usually carried out at temperatures of more than 1000° C.

Decomposition and secondary reactions which can lead to contamination of the product or to the occurrence of undesired mixed phases or undesired phases are also further prevented by the application of a pressure of between 15 and 40 bar.

In addition to the process according to the invention, the object of the present invention is also achieved by the nanocrystalline metal oxide material obtainable by the process according to the invention.

It was found that the nanocrystalline mixed oxide material according to the invention preferably has a crystallite size in the range from 5 nm-100 μm, preferably from 10 nm to 10 μm which, as already stated above, can be adjusted inter alia by the pulsation of the thermal treatment.

In quite preferred embodiments the crystalline mixed oxide material according to the invention is a material selected from the structural classes of the spinels, ilmenites and perovskites, with the result that a further field of application of the process according to the invention opens up in the synthesis of catalytically active or electrically conductive materials.

The process according to the invention is described in more detail with the help of the Figures using the following embodiment examples which are not to be considered as limiting.

The device used corresponds largely to the device described in DE 101 09 82, with the difference that the modified device used to carry out the process according to the invention does not require a preliminary evaporator step.

EXAMPLES

Example 1

Preparation of LaMnO$_3$ 2.5112 g Mn(NO$_3$)$_2$×4H$_2$O with 4.3302 g La(NO$_3$)$_2$×6H$_2$O and 4.2028 g citric acid was dissolved in 30 ml water at a temperature of 80° C. and slowly reheated to 150° C.

The resultant viscous solution was then introduced in atomized form into the previously described reactor by means of a Schenk dispenser. The residence time of the solution in the reactor was approx. 700 ms. The temperature was set at 270° C.

6.1 g LaMnO$_3$ (corresponds to a 95% yield) which has a BET surface area of 175 m$^2$/g was then removed from the reactor.

Example 2

Preparation of La$_{0.5}$Sr$_{0.5}$MnO$_3$ 1.07 g Sr(NO$_3$)$_2$, 2.60 g Mn(NO$_3$)×4H$_2$O, 2.22 g La(NO$_3$)$_2$×6H$_2$O and 4.20 g citric acid were dissolved at 80° C. in 30 ml water.

The solution was introduced into the reactor by means of a Schenk dispenser as in Example 1. The residence time of the powder in the reactor was likewise approx. 700 ms and the temperature of the reactor was 200° C. The yield of La$_{0.5}$Sr$_{0.5}$MnO$_3$ was 4.5 g and the BET surface area 185 m$^2$/g.

Example 3

During the oxidation of CO, the La$_{0.5}$Sr$_{0.5}$MnO$_3$ obtained in Example 2 was tested compared with La$_{0.5}$Sr$_{0.5}$MnO$_3$ prepared by means of hydroxide precipitation and subsequent calcining.

100 mg La$_{0.5}$Sr$_{0.5}$MnO$_3$ was mixed with 500 mg silica sand in each case in a silica glass reactor and the reaction allowed to flow in a stream of 35 ml (802 ppm CO in synthesis air) per minute. There was no activation of the powder.

Figure 1:
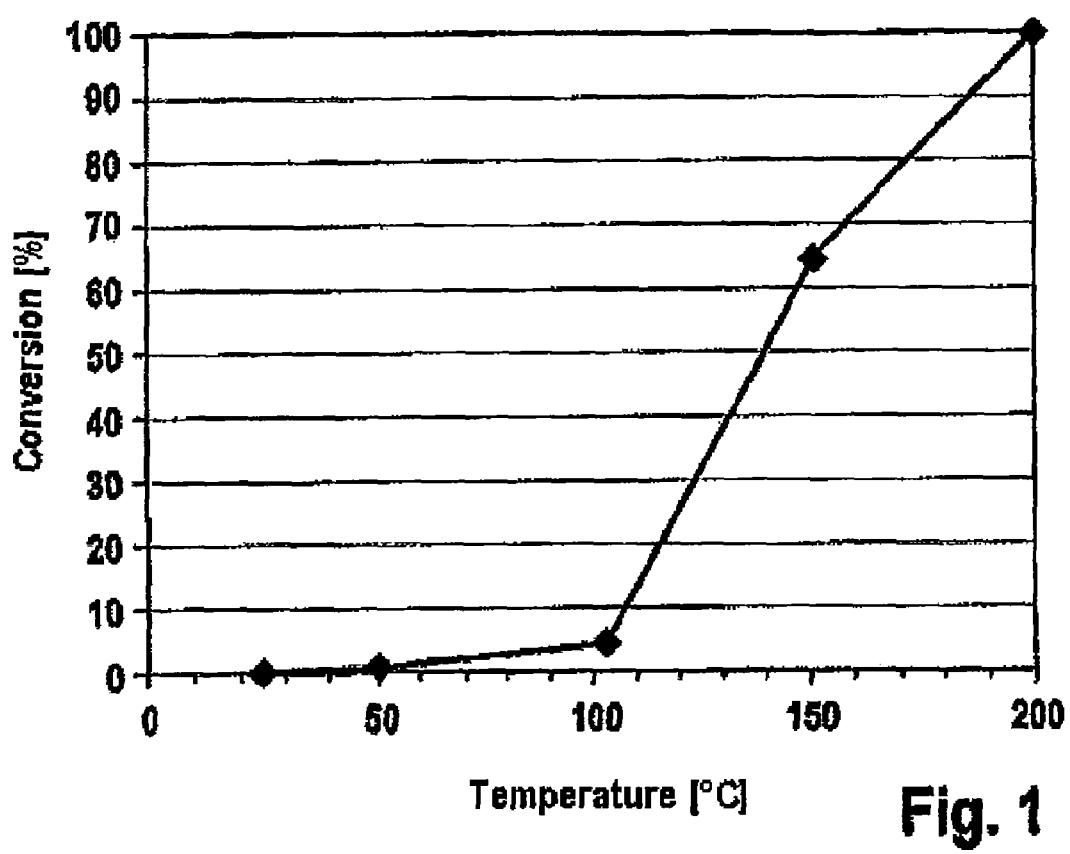
FIG. 1 shows the result of a CO oxidation test with a nanocrystalline LaSrMnO$_3$ material which was prepared by means of the process according to the invention.

FIG. 1 shows that a CO conversion of approx. 66% was already achieved at a temperature of 150° C. A complete conversion of the CO was already achieved at a temperature of 200° C.

Figure 2:
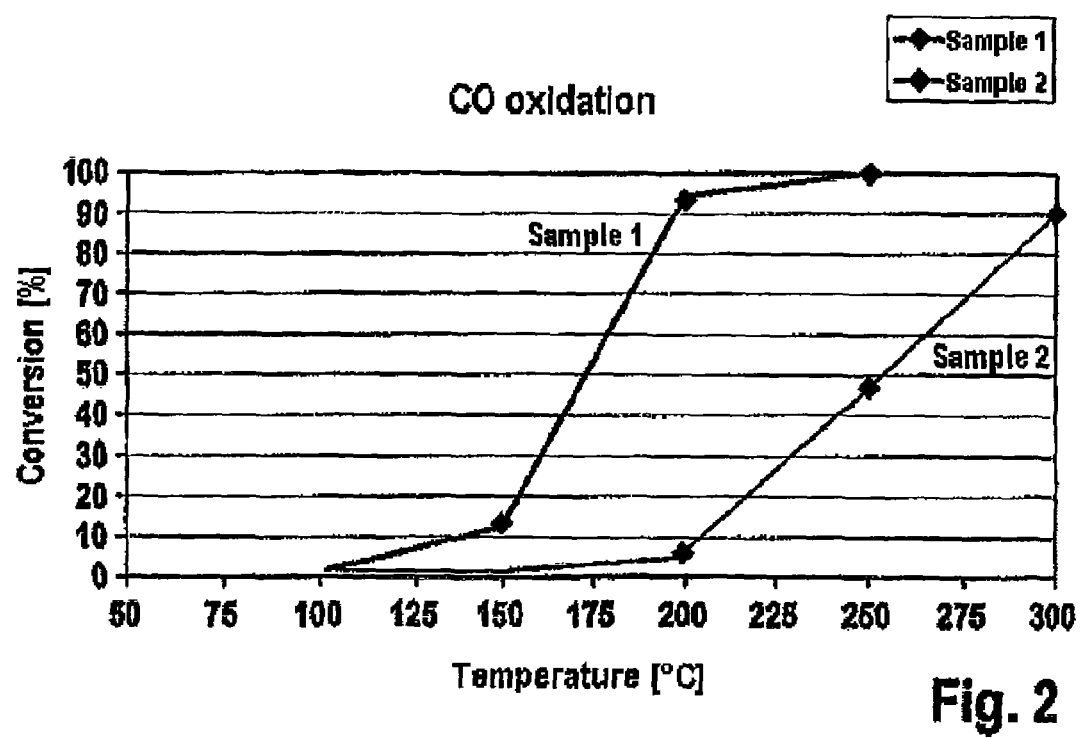
FIG. 2 shows the result of an oxidation using LaSrMnO$_3$ prepared by means of hydroxide precipitation.

In contrast, FIG. 2 shows the conversion of CO using two samples of the La$_{0.5}$Sr$_{0.5}$MnO$_3$ obtained by means of the hydroxide process.

As the curve of sample 1 shows, a conversion of approx. 13% CO was observed at a temperature of 150° C. At a temperature of approx. 200° C., 90% CO was converted and a 100% conversion obtained only at a temperature of 250° C.

The other sample (Sample 2) shows even poorer values. The comparison also shows that, with the classic hydroxide precipitation, products with uniform properties are not reliably obtained, something which is reliably possible with the process according to the invention.

The comparison between the two materials shows the improved catalytic activity of the nanocrystalline mixed oxides obtained by means of the process according to the invention.

The invention claimed is:

1. Process for the preparation of nanocrystalline mixed metal oxide particles from at least two different starting compounds, comprising the steps of
   a) introducing the stoichiometric mixture of the starting compounds into a reaction chamber by means of a carrier fluid,
   b) subjecting the starting compound to a pulsating thermal treatment at a temperature of 200° C. to 700° C. in a treatment zone under a pulse in the reaction chamber,
   c) formation of nanocrystalline mixed metal oxide particles,
   d) the removal from the reactor of the nanocrystalline mixed metal oxide particles obtained in steps b) and c), wherein the preparation of the mixture of the stoichiometric mixture of the starting compounds takes place at a temperature of >50° C.

2. Process according to claim 1, wherein the mixed metal oxides are selected from the structural classes of perovskites, ilmenites and spinels.

3. Process according to claim 1, wherein the stoichiometric mixture of the starting compounds is introduced into the reaction chamber in the form of a solution, slurry, suspension or solid.

4. Process according to claim 1, wherein the carrier fluid is a gas.

5. Process according to claim 1, wherein the stoichiometric mixture of the starting compound is introduced into the reaction chamber in the form of an aqueous solution.

6. Process according to claim 1, wherein additionally citric acid or a citric acid salt is introduced into the mixture of the starting compounds.

7. Process according to claim 1, wherein the mixture of the starting compounds is introduced into the reaction chamber in atomized form.

8. Process according to claim 1, wherein the pulsation of the pulsating thermal treatment is regular or irregular.

9. Process according to claim 1, wherein, after the thermal treatment in the treatment zone, the nanocrystalline mixed metal oxide particles that have formed are transferred into a colder zone of the reaction chamber.

10. Process according to claim 1, wherein the thermal treatment is carried out in a temperature range of 300 to 700° C.

11. Process according to claim 1, wherein the process is carried out at a pressure between 15 and 40 bar.

12. Nanocrystalline mixed metal oxide obtainable by a process according to claim 1.

13. Nanocrystalline metal oxide according to claim 12, wherein its crystallite size lies in the range from 10 nanometers to 10 micrometers.

14. Nanocrystalline metal oxide according to claim 12 of the perovskite, ilmenite or spinel structural type.

15. Nanocrystalline metal oxide according to claim 14 with a BET surface area in the range from 100-200 m$^2$/g.

* * * * *

UNITED STATES PATENT AND TRADEMARK OFFICE
CERTIFICATE OF CORRECTION

PATENT NO. : 8,361,619 B2  
APPLICATION NO. : 12/440303  
DATED : January 29, 2013  
INVENTOR(S) : Hans-Jörg Wölk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

First Day of September, 2015

Michelle K. Lee  
*Director of the United States Patent and Trademark Office*